March 27, 1962 R. E. HOWES ET AL 3,027,546
MAGNETIC CORE DRIVING CIRCUIT
Filed Oct. 17, 1956 5 Sheets-Sheet 1

INVENTORS
Royal E. Howes
Paul Higashi
By Earl Beust
Louis A Kline
John J. Matlago
their Attorneys March 27, 1962 R. E. HOWES ET AL 3,027,546

MAGNETIC CORE DRIVING CIRCUIT

Filed Oct. 17, 1956

5 Sheets-Sheet 2

INVENTORS
Royal E. Howes
Paul Higashi
By Karl Berst
Louis A Kline
John J. Matlago
their Attorneys INVENTORS
Royal E. Howes
Paul Higashi
By Earl Benst
Louis A Kline
John J. Matlago
their Attorneys March 27, 1962 R. E. HOWES ET AL 3,027,546

MAGNETIC CORE DRIVING CIRCUIT

Filed Oct. 17, 1956 5 Sheets-Sheet 4

INVENTORS
Royal E. Howes
Paul Higashi

By Carl Berst
Louis A. Kline
John J. Matlago
their Attorneys

INVENTORS
Royal E. Howes
Paul Higashi
By Earl Bengt
Louis A Kline
John J. Matlago
their Attorneys

United States Patent Office 3,027,546

Patented Mar. 27, 1962

3,027,546

MAGNETIC CORE DRIVING CIRCUIT

Royal E. Howes, Inglewood, and Paul Higashi, Los Angeles, Calif., assignors to The National Cash Register Company, Dayton, Ohio, a corporation of Maryland Filed Oct. 17, 1956, Ser. No. 616,439

8 Claims. (Cl. 340—174)

This invention relates to magnetic core storage systems and more particularly to an improved circuit arrangement employing transistors for selecting and driving cores in a magnetic core memory array.

When selecting cores in a magnetic core memory system, it is highly desirable, for simplicity of the system, that a minimum number of drive lines and drivers be used. It is also desirable when passing half-current pulses through a drive line that they have a fast rise time and a constant amplitude regardless of the linear inductance of the drive line and cores on that line and regardless of the back electromotive force in the drive line due to selected and unselected core changing magnetic state. A half-current drive pulse having these desired characteristics enables the cores to give read-out signals on the sense line which are constant in amplitude and further enables the noise voltages from unselected cores to occur in a short period of time, resulting in output signals that give reliable readings because of the decreased probability of spurious triggering of the memory flip-flop or of failing to trigger the memory flip-flop. Although, as is well known, the sense line is wound in such manner as to cancel the noise voltages from unselected cores, complete cancellation does not take place because of the non-uniformity of the magnetic characteristics of the cores, and these noise signals appear on the output of the sense line. Also, half-current drive pulses having the desired characteristics enable the cores, which are driven to their opposite magnetic state, to quickly reach a stable condition, thus allowing a short time interval for reading and writing.

In the prior art, selection of drive lines in a magnetic core memory array, in both the X and Y directions, is carried out at both ends of the array, using a system which has separate drive lines for reading and for writing. The drive lines are connected to read and write groups at one end and to common lines at the other end, such that one unique drive line of each of the read and write groups at the one end of the array is connected to each common line at the other end. In a complete memory system, a plurality of arrays are arranged in planes with the drive lines passing through a plurality of arrays in series rather than through the one array, in order to simultaneously select a core in each array. The groups of read and write drive lines and the common lines are connected between a high and a low potential by way of driver tubes at each end, which drivers are selected, by an address system, to allow half-current pulses to pass through desired drive lines. The read and write drive lines are wound through the cores in such a manner that half-current pulses, passing from the high to low potential, pass through core windings in opposite directions for reading and for writing. The use of a large potential difference for driving the half-current pulses overcomes the effect of the linear inductance in the drive lines and cores and the effect of the back electromotive force in the drive lines due to the cores changing state, which effects, if not overcome, would cause the half-current pulses to have a slow rise time and a variation in amplitude.

A serious limitation of the prior art is that the potentials which appear across a selected line also appear across driver tubes connected to other unselected groups of drive lines or common lines, thus overcoming their control bias and allowing current leakage through unselected lines. This current leakage also causes the half-current pulses to have a slow rise time and a variation in amplitude.

Another serious limitation of the prior art is that when using transistor drivers, which are characteristically limited to low potentials, the linear inductance in the drive lines and cores and the back electromotive force due to the cores changing state cannot be overcome by using a large current driving potential, as with tubes.

One arrangement of the prior art which gives satisfactory half-current pulses uses a large voltage source and a large current limiting resistor, and uses a diode clamp between the resistor and transistor drivers to limit the voltage. However, this arrangement requires very high voltage sources which increase the complexity of the power supplies. Another disadvantage is that the high voltage presents a danger to the transistor driver system in the event of failure of clamping diodes. Also, this prior art arrangement has a large power consumption because of the large potential and resistor and the current loss through the clamping diode. Another arrangement of the prior art is to use a low voltage with a feedback amplifier. However, that arrangement gives a poor rise time to the half-current pulses because of its poor frequency response. Therefore, when using transistors in the prior art, unless the clamping arrangement with a high voltage source and a high power loss is used, the linear inductance and back electromotive force in the lines causes the half-current pulses to have a very slow rise time and, with some arrangements, to have a variation in amplitude. Another limitation of the prior art is the complexity of winding when using separate wires for reading and for writing.

Briefly, this invention comprises an improved means for selecting and driving cores in a magnetic core memory system using transistors. The single drive lines, which pass through the cores in an X and a Y direction, are used for both reading and writing, thus simplifying the windings. Selection of groups of drive lines and common lines is carried out at both ends of the array, in both the X and Y directions, with an improved driver arrangement which makes use of symmetrical transistors to reduce the required number of drivers.

A novel driving arrangement is provided which overcomes the effect of linear inductance and the back electromotive forces in the drive lines, with low driving potentials and with low power requirements, thus satisfactorily eliminating one cause of poor rise time and variation in amplitude of the half-current pulses which are passed through the selected drive lines.

Also, to remove the other cause of poor rise time and variations in amplitude of the half-current pulses, which is current leakage through unselected drivers, the address matrix is arranged to effectively disconnect all unselected drivers. Therefore, because the half-current pulses have a fast rise time and a constant amplitude, the output signal gives reliable readings by decreasing the probability of undesirable triggering or failure of triggering of the memory flip-flop. Also, the selected cores, which are in a condition to be driven to their opposite magnetic state, reach their stable states very rapidly, thus allowing the reading and writing portions of the computer timing cycle to be carried out in short time intervals.

It is, accordingly, an object of this invention to provide an improved binary address system for a core memory using transistors which gives output signals that can be read reliably and which require only a short time interval for reading and for writing.

It is another object of this invention to provide a means, using transistors, for driving cores from low potential and with a low power loss, which delivers driving current pulses having a very fast rise time.

It is another object of this invention to provide a means, using transistors, of driving cores from a low potential and with a low power loss which will deliver a constant driving current regardless of the number of cores which are driven to the opposite state of magnetic flux.

It is another object of this invention to provide a method of driving cores with transistor drivers, which overcomes the characteristic poor response time of transistors.

It is a more general object of this invention to provide an improved magnetic core memory reading and writing arrangement.

These and other objects of this invention as well as a better understanding and comprehension thereof can be obtained from the following description and drawings in which.

Figure 1:
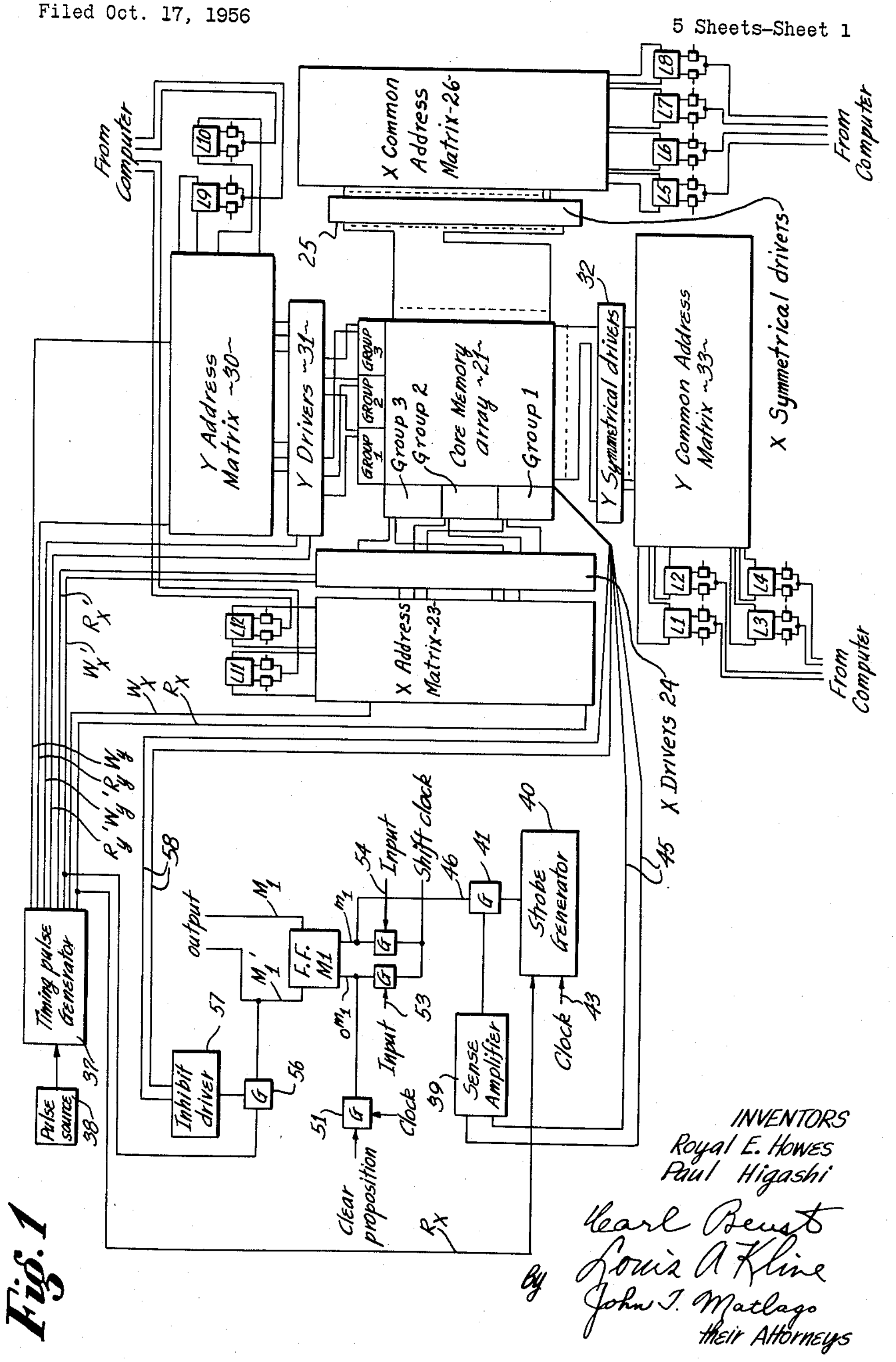
FIG. 1 is a schematic block diagram of the magnetic core memory system relevant to this invention.

Reference will now be made to FIG. 1 showing a schematic block diagram of the magnetic core memory system relevant to this invention. This figure will be used to explain the prior art with which this invention will be associated.

In order to select a particular core of memory array 21, an X and a Y address system is provided which selects one of the X and Y drive lines which pass through each row and column of cores of the array, respectively. In both the X and Y directions through the array, the drive lines are connected to groups 1, 2, and 3 at one end, and to common lines at the opposite end, with each common line connected to a corresponding drive line from each of the three groups. X drivers 24, in response to X address matrix 23, select a group 1, 2, or 3 for reading or for writing; and X symmetrical drivers 25, in response to X common address matrix 26, select a common line, resulting in selection of a single drive line in the X direction. X address matrix 23 receives its logical inputs from flip-flops L11 and L12, and X common address matrix 26 receives its logical inputs from flip-flops L5 to L8. Lines $R_x$ and $W_x$ from timing pulse generator 37 carry logical pulses which determine whether X address matrix 23 is to select a driver of X driver 24 for reading or for writing. Lines $R_x'$ and $W_x'$ deliver logical pulses to control the driving arrangement of X drivers 24.

The selection of the Y drive lines is performed in a similar manner except Y address matrix 30 receives its logical inputs from flip-flops L9 and L10 and Y common address matrix 33 receives its logical inputs from flip-flops L1 to L4. The logical pulses on lines $R_y$ and $W_y$ determine whether to read or to write in Y address matrix 30, and lines $R_y'$ and $W_y'$ connect to Y drivers 31 to deliver logical pulses to control the driving arrangement. Timing pulse generator 37, in response to signals from a clock pulse source 38, delivers the logical read and write pulses on lines $R_x$, $W_x$, $R_y$, etc. in conformity with the computer timing cycle.

During the reading cycle of the computer, if the selected core is storing a binary one, the core is driven to its zero state and an output signal is induced in sense line 45, this line passing through each core of memory array 21. This output signal then passes through sense amplifier 39 and through gate 41, when this gate is opened in response to a sampling pulse from strobe generator 40. Strobe generator 40 passes a sampling pulse to gate 41 when there is a coincidence of a clock pulse on line 43 and a read pulse on line $R_x$. The output signal then passes through line 46 to flip-flop M1 from which it appears as a true output on line $M_1$ and a false output on line $M_1'$, which lines connect to computer circuitry.

If the selected core is storing a binary zero, no signal appears on sense line 45, and $M_1'$ remains true, which is its condition due to the clear proposition that is passed through gate 51 prior to the read cycle.

During the write cycle of the computer, if $M_1'$ is false from reading a one, gate 56 is closed to prevent write pulse $W_x'$ from passing into inhibit driver 57. Thus inhibit driver 57 is prevented from passing an inhibit pulse through inhibit line 58, which line is strung through all cores of memory array 21. Therefore, the half-current pulses which are passed through the X and Y drive lines by the X and Y driving arrangement are able to write a one into the selected core. If $M_1'$ is true due to reading a zero from the memory, gate 56 is open and a write pulse $W_x'$ is allowed to pass into inhibit driver 57 during the write cycle of the computer. Therefore, an inhibit pulse is passed through inhibit line 58 to prevent the writing of a "one" by the half-current driving pulses passing through the X and Y drive lines to the selected core. It is to be noted that new information to be written into memory array 21 in the form of a zero or a one can be inserted into memory flip-flop M1 through input lines 53 or 54, respectively.

Figure 2:
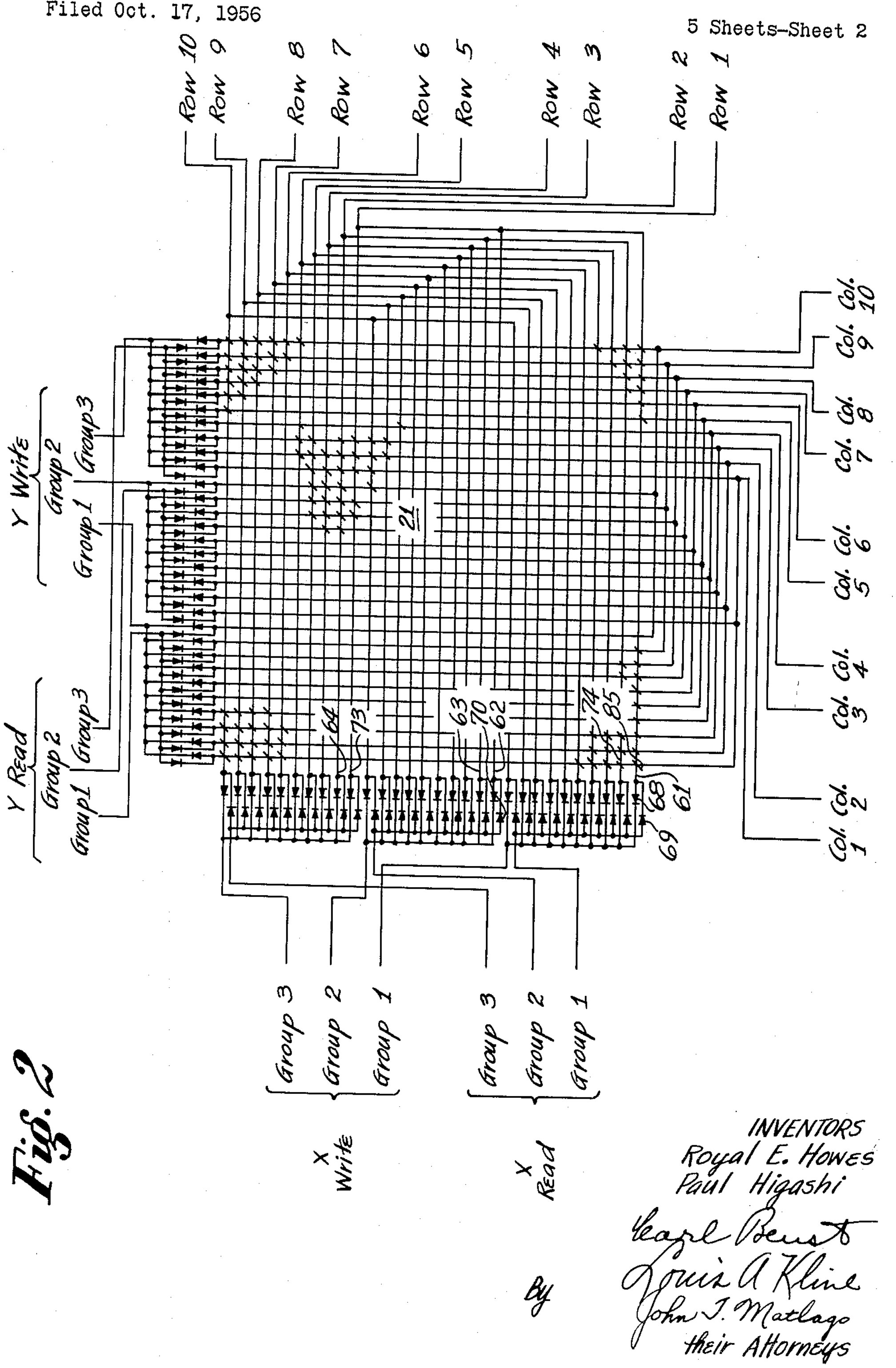
FIG. 2 is a circuit diagram of the core array 21 of the magnetic core memory system of FIG. 1.

Refer now to FIG. 2 which is a circuit diagram of magnetic core array 21 of FIG. 1.

This rectangular array comprises 900 cores, as core 85, 30 cores in both the X and the Y direction. For selection in the X direction, at the end of the array connected to read and write address lines, the drive lines are connected together into groups of diode connections 1, 2, and 3, each group connecting ten drive lines, as line 61. Into each of the three groups, an X read and a write address line is connected to select a particular group for reading or for writing. The X read address line for group 1 connects to the anode of diode 69 whose cathode connects to drive line 61. The X write address line for group 1 connects to the cathode of diode 68 whose cathode also connects to drive line 61. All ten drive lines associated with this group of diode connections connect in a similar manner to the read and write address lines for group 1. Also, the other two groups of diode connections 2 and 3 are connected in a similar manner. As is well known, the function of these diode connections is to prevent current from passing through the common connections of the drive lines and through unselected drive lines.

At the opposite end of the array from the read and write address lines are the common address lines for rows 1 to 10 which are common for both reading and writing and are each connected to three drive lines, one from each of the three groups. Selection of one of these common address lines selects a corresponding drive line in each of the three groups at the read and write select end of the array. Thus selection of one read or write address line, as for group 1, and one of the ten common address lines, as for row 1, at the opposite end of the array, results in a single X drive line, as line 61, being selected to pass a half-current pulse through for reading or writing. The selection system for the Y drive lines, which are arranged in columns, is similar.

It is to be noted that although, for simplicity of explanation, FIG. 1 shows only core array 21, a complete memory system is comprised of a plurality of such arrays with the drive lines passing through each array in series. As well known in the art, selection of a single core in memory array 21 also selects a similarly located core in all arrays. A separate reading and writing arrangement comprising a sense and inhibit line is used for each array.

Figure 3:
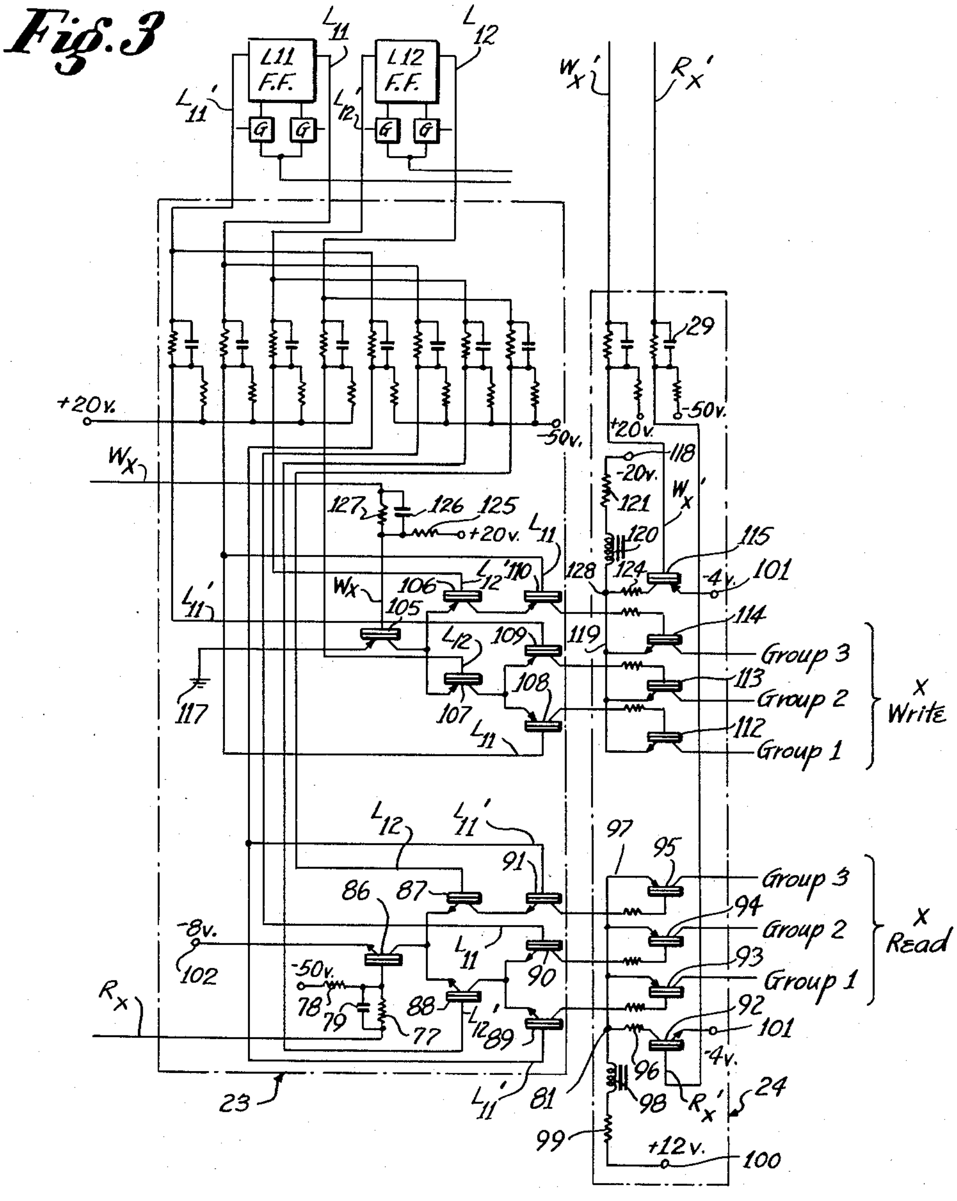
FIG. 3 is a schematic diagram of the X address matrix 23 and X driver 24 of FIG. 1.

Refer now to FIG. 3 which is a schematic diagram of the X address matrix 23 and X drivers 24 of FIG. 1.

Address matrix 23, in response to the logical outputs from memory selection flip-flops L11 and L12 and from timing pulse generator 37 of FIG. 1, selects a driver that connects to one of the read or write address lines for groups 1, 2, or 3, allowing a half-current pulse to pass through. It is to be noted that the two logical voltage levels used by this memory system are 0 volts for a true signal and −8 volts for a false signal. A separate binary decoding arrangement is used for reading and for writing in address matrix 23. For reading, selection of a particular one of drivers 93, 94, or 95 is carried out by n-p-n type transistors 86 to 91. Transistor 86 has its emitter connected to −8 volt terminal 102, its base connected to logical line $R_x$, and its collector connected to the emitters of transistors 87 and 88. Transistor 87 has its base connected to logical line $L_{12}$ and its collector connected to the emitter of transistor 91, and transistor 88 has its base connected to logical line $L_{12}'$ and its collector connected to the emitters of transistors 89 and 90. Transistor 91 has its base connected to logical line $L_{11}'$ and its collector connected to the base of driver 95. Transistor 90 has its base connected to logical line $L_{11}$ and its collector connected to the base of driver 94, and transistor 89 has its base connected to logical line $L_{11}'$ and its collector connected to the base of driver 93. Transistor 86 is conductive when $R_x$ is high or true and transistors 87 to 91 are conductive when true signals are applied to their respective bases from the outputs of flip-flops L11 and L12. The drivers 93, 94, and 95, which are p-n-p type transistors, are selected to pass current from their emitters to collectors when the voltage impressed on their bases is low and current flows from their bases to terminal 102. The collectors of drivers 93, 94, and 95 are connected to the read address lines for groups 1, 2, and 3, respectively.

As an example of the operation of the read address matrix, driver 93 conducts only when the combination of transistors 86, 88, and 89 conduct a base current from the base of driver 93 to terminal 102 as a result of logical lines $R_x$, $L_{12}'$, and $L_{11}'$ going true. Driver 93 then passes a current pulse from +12 volt terminal 100 through resistor 99, inductor 98, and line 97 into the read selection line for group 1 to the memory array of FIG. 2.

Associated with drivers 93, 94, and 95 is dummy or auxiliary driver 92 which is an n-p-n type transistor and has its collector connected to line 97 at junction 81 by way of resistor 96, and its emitter connected to −4 volt terminal 101. Line 97 connects from the collector of dummy driver 92 and the emitters of drivers 93, 94, and 95 to +12 volt terminal 100 by way of inductance 98 and current controlling resistor 99. The base of dummy driver 92 connects to logical line $R_x'$.

For writing, selection of a driver a carried out by transistors 105 to 110, all of the p-n-p type. Transistor 105 has its emitter connected to ground 117, its base connected to line $W_x$, and its collector connected to the emitters of transistors 106 and 107. Transistor 106 has its base connected to logical line $L_{12}'$ and its collector connected to the emitter of transistor 110, and transistor 107 has its base connected to logical line $L_{12}$ and its collector connected to the emitters of transistors 108 and 109. Transistor 110 has its base connected to logical line $L_{11}$ and its collector connected to the base of driver 114. Transistor 109 has its base connected to logical line $L_{11}'$ and its collector connected to the base of driver 113, and transistor 108 has its base connected to logical line $L_{11}$ and its collector connected to the base of driver 112. Transistor 105 is conductive when the pulse on logical line $W_x$ is false and transistors 106 to 110 are conductive when false or low signals are applied to their respective bases from flip-flops L11 and L12. The write drivers 112, 113, and 114, which are n-p-n type transistors, allow current to pass from their collectors to emitters when current can flow from ground 117 through their bases to the low potential of terminal 118 connected to their emitters. The collectors of drivers 112, 113, and 114 are connected to the write address lines for groups 1, 2, and 3, respectively. For an example of the operation of this write address matrix, current passes from ground 117 into the base of driver 112 only when transistors 105, 107, and 108 conduct in response to low or false signals on logical lines $W_x$, $L_{12}$, and $L_{11}$, respectively. Thus, a current pulse flows through the write address line for group 1 from the memory array of FIG. 2, through the selected driver 112 and into line 119 to −20 volt terminal 118.

Write dummy driver 115, which is a p-n-p type transistor, has its emitter connected to −4 volt terminal 101 and its collector connected to line 119 at junction 128 by way of resistor 124. Line 119 connects from the collector of dummy driver 115 and the emitters of drivers 112, 113, and 114 to −20 volt terminal 118 by way of inductance 120 and current limiting resistor 121. Logical line $W_x'$ connects to the base of dummy driver 115.

It is to be noted that the transistors of address matrix 23 connected to the read drivers 93, 94, and 95 are of the n-p-n type and those connected to the write drivers 112, 113, and 114 are of the p-n-p type because the bases of all drivers are required to be connected to the collectors of the address transistors, in order to effectively disconnect unselected drivers, as will be discussed. Therefore, in order that the selection of the groups which is carried out by the outputs of flip-flops L11 and L12 will occur simultaneously for reading and writing, one flip-flop output is connected to transistors of the read matrix and the other output is connected to corresponding transistors of the write address matrix. The determination whether to read or to write is accomplished through transistors 86 and 105 which are controlled by respective "Read" and "Write" control potentials supplied on respective lines $R_x$ and $W_x$.

Connected to the base of each p-n-p transistor of X address matrix 23 is a respective circuit including a current limiting resistor and parallel capacitor which allows the high frequency components of the logical signal to pass through, compensating for the fall-off of gain with frequency of the transistor. For example, a circuit including current limiting resistor 127 and capacitor 126 is connected to the base of transistor 105. A +20 volt terminal is connected by way of resistor 125 to logical line $W_x$ at the junction of current limiting resistor 127 and the base of transistor 105. This arrangement prevents any current passing through unselected transistors, since, when the logical signal on line $W_x$ is high or 0 volts, current flows from the +20 volt terminal through the voltage divider comprising resistor 125 and current limiting resistor 127 to maintain a voltage of +.5 volt on the base of the transistor. When logical line $W_x$ is false (−8 volts) and transistor 105 is conducting, the voltage divider prevents the voltage on its base from rising above −1 volt and allows base current to flow.

The base of each n-p-n transistor of X address matrix 23 is connected to its logical source by way of a circuit comprising a current limiting resistor and parallel capacitor. For example resistor 77 and capacitor 79 are comprised in a circuit connecting the base of transistor 86 to its logical source. A −50 volt terminal connects by way of resistor 78 to logical line $R_x$ at the junction of resistor 77 and the base of transistor 86. This arrangement acts in a manner similar to the p-n-p arrangement to maintain the base at −8.5 volts when transistor 86 is biased into non-conduction, thus preventing any undesired collector to emitter current flow.

Figure 4:
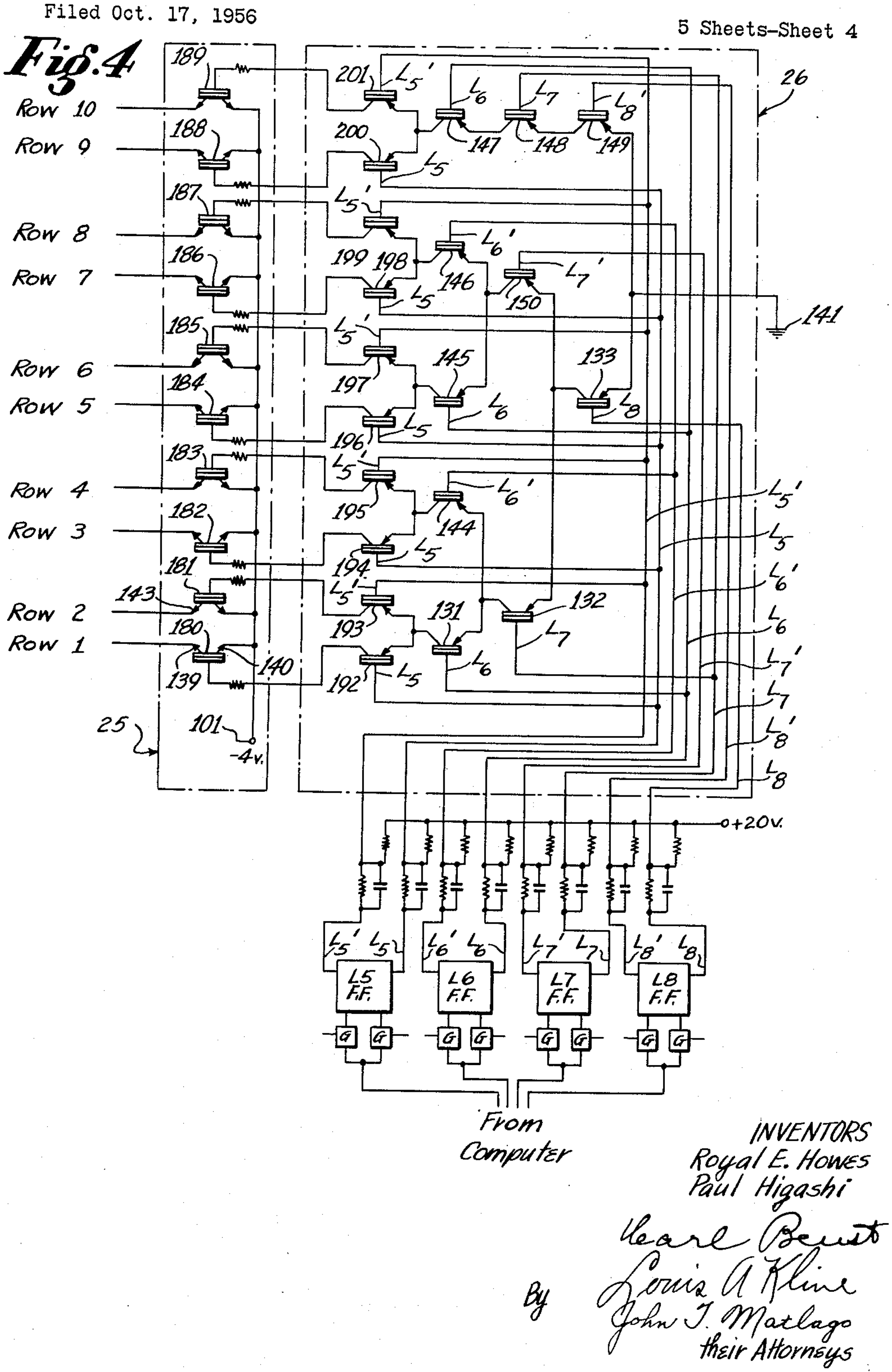
FIG. 4 is a schematic diagram of the X common address matrix 26 and X symmetrical drivers 25 of FIG. 1.

Refer now to FIG. 4 which is a circuit diagram of the X common address matrix 26 and X symmetrical drivers 25 of FIG. 1.

Selection to pass current pulses through the common address lines, which connect to the core array of FIG. 2, as for example the common address line for group 1, is carried out by a transistor address matrix 26 which selects a driver, as symmetrical driver 180. This address matrix responds to the logical outputs from memory flip-flops L5 to L8.

The address matrix 26 comprises ten logical transistors 192 to 201, transistors 192, 194, 196, 198, and 200 with their bases connected to logical line $L_5$ and the other five with their bases connected to logical line $L_5'$. Connected to the common emitters of each two adjacent transistors 192 and 193, 194 and 195, etc. of transistors 192 to 201 are the collectors of transistors 131, 144, 145, 146, and 147, respectively. Transistors 131, 145, and 147 have their bases connected to logical line $L_6$ and transistors 144 and 146 have their bases connected to logical line $L_6'$. Connected to the common emitters of the combinations of transistors 131 and 144 and transistors 145 and 146 are the collectors of transistors 132 and 150, respectively. Transistor 132 has its base connected to logical line $L_7$ and transistor 150 has its base connected to logical line $L_7'$. The emitters of these two transistors are connected to the collector of transistor 133 which has its base connected to logical line $L_8$ and its emitter connected to ground 141. Transistor 147 has its emitter connected to the collector of transistor 148 and its base connected to logical line $L_6$. Transistor 148 has its emitter connected to the collector of transistor 149 and its base connected to logical line $L_7$, and transistor 149 has its emitter connected to ground 141 and its base connected to logical line $L_8'$.

All logical transistors of the common address matrix 26 are of the p-n-p type and pass current when their bases receive a false or low signal. The ten logical transistors 192 to 201 have their collectors connected to the bases of the ten symmetrical drivers 180 to 189, respectively, which conduct when current can pass into their bases from ground 141. These symmetrical drivers are n-p-n type transistors whose symmetrical qualities allow current to flow either way through their emitters and collectors depending upon the direction of potential difference, as well known in the art. Thus current will flow through symmetrical driver 180 from connection 139 to 140 or from connection 140 to 139 depending upon the potential impressed on the common address line for row 1, as compared to the potential at connection 140 which connects to —4 volt terminal 101. For an example of the operation of this common address matrix, symmetrical driver 180 will pass current from ground 141 into its base only when transistors 192, 131, 132, and 133 have a false signal applied to their bases from logical lines $L_5$, $L_6$, $L_7$, and $L_8$, respectively, resulting in a current pulse flowing from connection 139 to 140 or from connection 140 to 139. The +20 volt terminals connected to logical lines $L_5'$, $L_5$, $L_6'$, etc. prevent any current passing through the address transistors when a true pulse is applied to their bases, in a similar manner to those of X address matrix 23.

Refer now to FIGS. 2, 3, and 4 for a description of the operation of this selection and driving system. Reading or writing takes place when the computer timing cycle causes the timing pulse generator 37 of FIG. 1 to form true read pulses $R_x$ and $R_y$ or false write pulses $W_x$ and $W_y$. The logical selection by the address flip-flops precedes each read-write cycle and remains unchanged for the cycle during which the read and write pulses determine whether to read or to write. Thus, during reading, line $R_x$ goes true and a current pulse is passed from +12 volt terminal 100 through the driver 93 for example, selected by the X address matrix 23, and through the address lines, as the group 1 line, to the drive line, as line 61, of the core array. The pulse then passes through the drive line 61, through the common addess line for row 1, and through the symmetrical driver, as 180, selected by common address matrix 26 of FIG. 4, to the —4 volt terminal 101. During writing, line $W_x$ goes false and a current pulse passes from —4 volt terminal 101 through a symmetrical driver, as driver 180, selected by X common address matrix 26, through the address line for row 1 and through the drive line, as line 61, of the core array. The pulse then passes through the address line for group 1 to the driver, as 112 for example, selected by the X address matrix 23, to —20 volt terminal 118. Thus the current pulse passes through the selected drive line, as line 61, of the array in one direction during reading and in the opposite direction during writing. The application of symmetrical transistors for drivers, as 180, allows the use of the same drivers for both reading and writing, resulting in a saving of components.

The diodes of groups 1, 2, and 3 of FIG. 2 prevent current from passing through the unselected drive lines of the array, as is well known in the art. For example, during reading, current passes from the read address line of group 1 through diode 69, through drive line 61 to the common address line of row 1 and to symmetrical transistor 180. However, there is also a current path from the common address line for row 1 through X drive line 62 to diode 70. If it were not for these diodes, as diode 70, current would flow from drive line 62, through drive line 63, through drive line 64 and through drive line 73 back into the common address line for row 1. Thus the diodes, as diode 70, are connected between both the read and write select lines and the drive lines so as to prevent current from passing through unselected drive lines.

Figure 5:
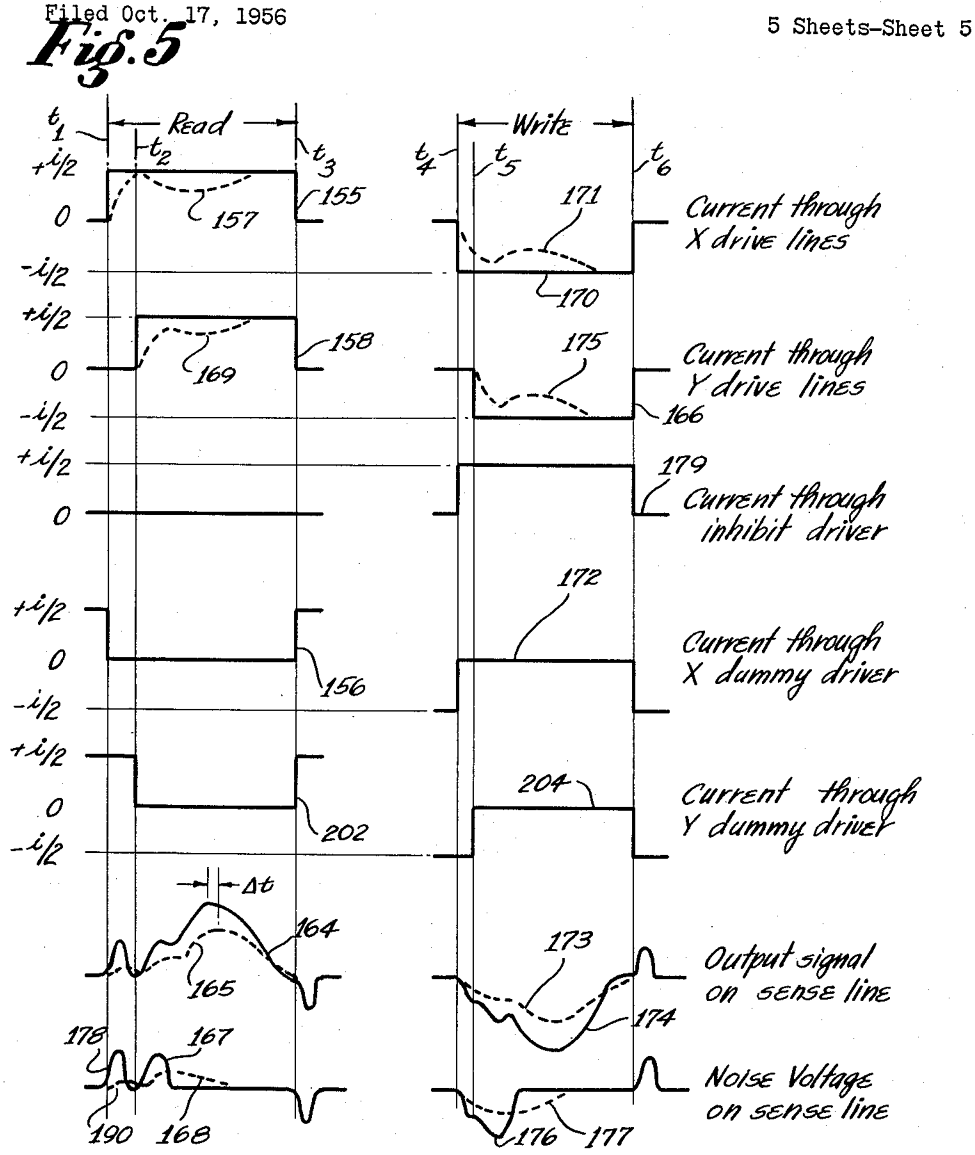
FIG. 5 is a timing diagram of the waveforms to explain the novel driving arrangement of this invention.

Refer now to FIG. 5 which is a diagram of the waveforms to explain the novel driving ararngement of this invention. With the selecting and driving arrangement of this invention, the half-current pulses pass through the X and Y drive lines during reading, as shown by wave-forms 155 and 158, respectively, and the half-current pulses pass through the X and Y drive lines during writing, as shown by waveforms 170 and 166, respectively. These pulses during writing are shown inverted from those during reading to indicate current passing in opposite directions through the drive lines.

During reading, the half-current pulse through the X drive lines occurs at time $t_1$ and the half-current pulse through the Y drive line occurs at time $t_2$. As well known, this time delay allows the noise signal, as shown by waveform 178, from the unselected cores on the X drive line to rise and fall before the selected cores begin to change their magnetic state at time $t_2$. Thus this noise signal cause by the X drive lines interferes a minimum amount with the output signal to be read.

During writing, the half-current pulse through the X drive lines, as shown by waveform 170, and through the inhibit driver, as shown by waveform 179, occur at time $t_4$ and the half-current pulse in the Y drive line occurs at time $t_5$, as shown by waveform 166. As well known, this time delay allows the inhibit pulse to rise to its steady state amplitude before the second half-current pulse is passed through a selected core. Each half-current pulse of waveforms 155, 158, 170, and 166 has an amplitude of $i/2$ which, for example, is a value of 200 ma. for the cores of this embodiment.

However, when using low driving potentials with transistor driving arrangements, these half-current pulses conventionally have a shape as shown by waveforms 157, 169, 171, and 175, respectively. The slow rise time of waveforms 157 and 169 and the slow fall time of waveforms 171 and 175 is caused by the resistance to current flow from the characteristic linear inductance of the drive lines and the cores through which the lines pass.

The decrease of amplitude of these waveforms from the $i/2$ or $-i/2$ values is due to the resistance to current flow caused by the back electromotive force of the selected cores which are changed from one magnetic state to another and the smaller back electromotive force of the unselected cores. It is to be noted that slow rise time and variation in amplitude of the half-current pulses can also be caused by current leakage through unselected drivers as will be discussed later. As an example, the back electromotive force in the drive lines due to one or a plurality of cores changing state in response to driving pulses 155 and 158 or driving pulses 170 and 166 is similar to the output signal of waveforms 164 and 174, respectively. The back electromotive force in the drive lines due to one or a plurality of unselected cores changing state in response to the half-current pulses of waveform 155 or 158 is similar to the noise voltages of waveforms 178 or 167, respectively.

During reading, when a core is driven to its opposite magnetic state, an output signal appears on sense line 45 (FIG. 1), as shown by waveform 164, if the half-current pulses, as shown by waveforms 155 and 158, are maintained. However, if the half-current pulses have the slow rise time and low amplitude of waveforms 157 and 169, the output signal also has a low amplitude, as shown by waveform 165. The peak of the output signal occurs at the time when the core changing its state along its characteristic hysteresis loop is in the portion of the loop where the greatest rate of flux change occurs. Thus, at this time the largest back electromotive force is induced in the drive lines and the lowest amplitude of the half-current pulses of waveforms 157 and 169 occur. As was discussed, in a complete memory system, one core in each of the arrays which make up that system is selected simultaneously. Thus, when a large number of the cores selected on a drive line are storing a binary "one" resulting in a large total back electromotive force when they change their state and a reduction of current in the half-current pulses, as shown by waveforms 157 and 169, a longer time is required for the cores to change their state than if none of the cores were storing a binary "one". As an example of this time delay, the peak of the output signal, as shown by waveform 165, occurs $\Delta t$ time later than if constant current driving pulses were maintained. The time at which the peak of the output pulse occurs depends on the number of cores which change their state. During reading, this variation in time $\Delta t$ of the peak of the output pulse prevents the strobe generator 40 of FIG. 1 from always sampling the output signal at its peak, resulting in the possibility of failure of the output signal to trigger the memory flip-flop.

Also, when passing the half-current pulses of waveforms 155 and 158 through a drive line, the unselected cores will cause a noise voltage to appear on sense line 45 (FIG. 1), as shown by waveforms 178 and 167. However, the poor rise time and low amplitude of waveforms 157 and 169 causes the noise signals to occur over a longer period of time, as shown by waveforms 190 and 168, respectively, which add to give a signal which may cause undesired triggering of the memory flip-flop at the time of sampling.

It is to be noted that the sense line is conventionally wound in opposite directions through adjacent rows of cores in order to cancel the noise signals from the unselected cores. However, noise voltages still appear at the output of the sense line because of the varying characteristics of the cores preventing total cancellation. Because of this method of winding of the sense line, the noise voltages may appear on the output as shown by waveforms 167 and 168 or may appear inverted. Also, because of the winding of the sense line, the output signal may appear inverted from waveforms 164 and 165. Thus, when the noise voltage of waveform 168 is inverted from the output signal of waveform 165, the noise voltage will be subtracted from the amplitude of this low amplitude output signal. This condition results in a decrease of the amplitude of the output signal at the time its peak occurs and increases the possibility of failure to trigger the memory flip-flop.

Another disadvantage of the half-current pulses of waveforms 157 and 169 during reading is that the cores take a long time to reach a stable state, as indicated by the output signal of waveform 165 returning to its normal state slowly. This condition requires the half-current pulses to fall at a later time than $t_3$, resulting in a long time interval being required for reading.

During writing with the selection and driving arrangement of this invention, the half-current pulses of waveforms 170 and 166 will form the output signal of waveform 174 and the noise voltage of waveform 176. The conventional half-current pulses of waveforms 171 and 175 would form an output signal of waveform 173 and a noise voltage of waveform 177. The output signal of waveform 174 rises quickly, indicating that writing can be done in a shorter period of time than with the output signal of waveform 173.

It is to be noted that the amplitude of the half-current pulses, as shown by waveforms 155, 158, 170, and 166, cannot be increased since this would increase the noise voltage from unselected cores. The driving arrangement of this invention, in combination with the address matrix which prevents current leakage through unselected drivers, at all times maintains half-current pulses, as shown by waveforms 155, 158, 170, and 166, to give desirable output signals as shown by waveforms 164 and 174.

Refer now to FIGS. 3 and 5 for a further description of the operation of the driving circuit arrangement. The description will be made in reference to the driving arrangement for the X drive lines, but it is to be noted that the driving arrangement for the Y drive lines is similar. The current pulse which passes through the selected read driver 93, 94, or 95 passes from terminal 100 by way of resistor 99 and inductance 98 to the selected driver. At all times, when none of these read drivers are selected, this circuit acts to maintain a current through resistor 99 and inductance 98 by means of dummy driver 92 conducting current to terminal 101. Dummy driver 92 conducts and all of the read drivers 93, 94, and 95 are unselected when logical line $R_x$ is false and line $R_x'$ is true as determined by the timing pulse generator 37 of FIG. 1. However, when reading, line $R_x$ goes true and $R_x'$ goes false, at which time the read driver 93, 94, or 95, which has been selected by the flip-flops at the beginning of the read-write cycle, is allowed to pass a current pulse, as shown by waveform 155, and dummy driver 92 is stopped from conducting, as shown by waveform 156.

Conventionally, when using a low driving potential, the current pulse which passes through the selected line of cores would have a slow rise time and low amplitude, as was discussed. However, when the current which flows through inductance 98 is switched from its path through dummy driver 92 to the selected driver, inductance 98 acts to prevent a change of current through its coils which would be caused by the linear inductance of the lines and the back electromotive force of the cores changing state. Inductance 98 characteristically resists these current changes by inducing a potential between its input and output from the energy stored in its inductive field, such as to act as a source of voltage to maintain a constant current flow. This characteristic results in a sharp rise of voltage at junction 81 which gives the half-current pulse a fast rise time and which continues as required to force a constant current through the selected drive line.

Resistance 96 is made equal to an effective resistance in the path through the drive lines which is an average of the resistance when many and when no cores are changing state, as was discussed, in order to maintain the desired current, as shown at the $+i/2$ current level of waveform 156, through dummy driver 92. Therefore, there will be only a very small change of current through inductance 98 when switching from the X dummy driver to the selected driver. It is to be noted that the current pulse through the Y dummy driver (not shown) is as shown by waveform 202. Also, resistor 99, which is large as compared to the effective change of impedance of the drive line since it is connected to the +12 voltage of terminal 100, reduces the amplitude of current variations caused by the small changes of effective impedance in the drive lines, within a range which can be controlled by inductance 98. Another advantage of this circuit is that the sharp rise of voltage at junction 81 caused by inductance 98 acts to overcome the well-known characteristic slow response time of load current pulses through transistors. The sharp rise of voltage on the emitter of the selected driver, as 93, forces the base current to flow through this driver, resulting in the carriers forming quickly and the emitter to collector current pulse having a fast rise time. It is to be noted that the shortness of time of the half-current puluses is only limited by the amount of amplitude, of the sharp change in voltage from inductance 98, that the transistors can withstand, and by the fall time of the current pulse through the dummy driver. However, the capacitor 29 in the base line of dummy driver 92 decreases the fall time of the pulse through this transistor, thus allowing the half-current pulse to have a fast rise time. Also, the potential at terminal 100 determines the recovery time of the inductive field of inductance 98 which limits the repetition rate of reading with the desirable results of this circuit. However, as is well known, a computer timing cycle follows each read portion of the cycle with a time interval before the write portion, thus providing sufficient recovery time for the inductance 98. Thus, this driving circuit arrangement overcomes the characteristic slow response time of transistors and overcomes the linear inductance and back electromotive force in the drive lines to deliver, in combination with the arrangement of this invention to prevent current leakage, a half-current pulse which has a fast rise time and a constant amplitude as shown by waveform 155. It is to be noted that this driving arrangement using an inductance has a very good high frequency response as compared to feedback amplifiers. This pulse of waveform 155 through the X drive line, in combination with the pulse of waveform 158 through the Y drive lines, gives a desirable output signal during reading as shown by waveform 164 and a noise signal of short duration as shown by waveform 167.

At all times, when a write cycle is not occurring and current is not passing through write drivers 112, 113, or 114, current flows through dummy driver 115 from terminal 101 to terminal 118 by way of inductance 120 and resistor 121. In this condition, line $W_x$ is true and line $W_x'$ is false as determined by the timing pulse generator 37 of FIG. 1. When a write cycle occurs, line $W_x$ goes false and line $W_x'$ goes true, preventing conduction through dummy driver 115, as shown by waveform 172, and allowing current, as shown by waveform 170, to flow through the driver 112, 113, or 114 which was selected by the address matrix at the beginning of the read-write cycle. Inductance 120 then resists changes of current in a manner similar to the read driving system to act as a source of voltage to maintain the current flow. Therefore, there is a sharp fall of voltage at junction 128 which continues as required to maintain a constant current through inductance 120. In a manner similar to resistor 96 of the read driving system, when $W_x'$ is false, resistor 124 maintains a desired current through dummy driver 115 as shown by the $-i/2$ current level of waveform 172. The current pulse, when $W_x'$ is false through the Y dummy driver (not shown), is shown by waveform 204. Resistor 121 has an effect similar to resistor 99 of the reading driver. Also, the characteristic slow response time of a current pulse through a transistor is overcome by inductance 120. The sharp fall of voltage at junction 128, when a driver, as 112, is biased into conduction, acts in a manner similar to the read driving system to give the drivers a fast response time. Thus during writing this novel circuit overcomes the characteristic slow response time of transistors and overcomes the linear inductance and back electromotive force in the drive lines to give, in combination with the arrangement of this invention to prevent current leakage, a half-current pulse which has a fast fall time and a constant amplitude as shown by waveform 170. It is to be noted that the limitations on the shortness of the rise time and the repetition rate of the half-current pulses are similar to those during reading, as was discussed. This half-current pulse of waveform 170 through the X drive line, in combination with the half-current pulse of waveform 166 through the Y drive line, gives an output signal, as shown by waveform 174. Although this output signal is not passed through the sense amplifier 39 of FIG. 1, the advantage of this driving arrangement during writing is to allow the writing to take place in a short time interval since the core quickly reaches a stable state, as is indicated by waveform 174. Thus the driving arrangement of this invention overcomes the linear inductance and back electromotive force in the drive lines to deliver satisfactory half-current pulses from low potential driving sources, and because of the low voltages and low values of resistors 99 and 121, requires a minimum amount of power.

In order for this driving arrangement to deliver these desirable half-current pulses, the other cause of poor rise time and variation in amplitude of the half-current pulses, which is current leakage through unselected drivers, must be overcome. This is accomplished by arranging the address matrix to effectively disconnect the unselected drivers from a source of current. When selecting a driver for reading, as driver 93, the sharp rise of voltage at junction 81 from inductance 98 would cause some current to flow through drivers 94 and 95 if their bases were not effectively disconnected from a source of current. This current leakage would cause the half-current pulse through the selected driver to have a poor rise time and a variation in amplitude. However, since the bases of drivers 94 and 95 are connected to the collectors of transistors 90 and 91, which in turn are connected to the collectors of transistors 88 and 87, this high voltage will not cause a current to flow through drivers 94 and 95. This result is because a change of voltage on the collector of a transistor in the arrangement in this matrix characteristically will not cause a flow of base current and thus will not allow a flow of collector to emitter current. As was discussed, since current flows in opposite directions during reading and writing, both p-n-p and n-p-n type transistors are used in X address matrix 23 in order that all the bases of the drivers can be connected to collectors of the transistors of the matrix.

Therefore, when driver 93 is selected and passes a current pulse, the rise of voltage on the emitter of driver 94 which appears on its base and the collector of transistor 90 will not cause a base current to flow through transistor 90. Thus, since no collector to emitter current can flow through transistor 90, no base current can flow through driver 94, and the unselected driver 94 is prevented from passing any emitter to collector current. Since, when driver 93 is selected, transistor 91 is an open gate because of the arrangement of the matrix, the rise of voltage is impressed in the collector of transistor 87 which also effectively disconnects driver 95 from a source of base current.

In a similar manner, the connections of the bases of drivers 112, 113, and 114 to the collectors of p-n-p transistors 108, 109, and 110, respectively; the connection of the emitter of transistor 110 to the collector of transistor 106; and the connection of the emitters of transistors 108 and 109 to the collector of transistor 107 prevent the unselected drivers during writing from passing current as a result of the low voltage at junction 128 from inductance 120.

Also, during writing, the fall of voltage at junction 128 appears on the write select lines, as of group 1, for example, and passes through the unselected drive lines, as line 74 (FIG. 2), to the common address lines for row 2 (FIG. 2). From this line, the fall in voltage is impressed on the connection 143 of the unselected symmetrical driver 181 (FIG. 4). This fall in voltage would cause current to flow through this unselected symmetrical driver if its base were not effectively disconnected from a current source by being connected to the collector of the logical transistor 193. Also, for example, a fall in voltage impressed on unselected symmetrical driver 182 would cause base current to pass through transistor 194, which is an open gate when symmetrical driver 180 is selected, but transistor 144, which is a closed gate, effectively disconnects the symmetrical driver from a source of base current.

Thus, this core selection and current driving system during reading and writing passes current through the selected drivers without allowing any current leakage through unselected drivers.

The Y address matrix 30, Y drivers 31, Y symmetrical drivers 32, and Y common address matrix 33 of FIG. 1 have not been explained in detail. However, they are arranged in a manner similar to the teachings of this invention.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A current driving circuit comprising: a source of driving current; an inductor; a load line including a magnetic core array drive line for changing magnetic state of a magnetic core inductively linked to the drive line, said load line thereby having a variable impedance; a resistor having a value approximately equal to the average impedance of said load line; a first means capable of connecting said source through said inductor to said load line; a second means capable of connecting said source through said inductor to said resistor; and switching means for enabling said second means to conduct whenever said first means is not conducting, whereby current of substantially constant value is enabled to at all times flow through said inductor so as to resist any changes in drive current through said load when said first means is switched to a conductive condition.

2. A current driving circuit comprising: a source of driving current; an inductor; a load line having a varying inductive impedance; a resistor having a value equal to the average impedance of said load line; a transistor driver having a collector, an emitter, and a base for connecting said source through said inductor to said load line by way of its collector-emitter path; an auxiliary transistor having a collector, an emitter, and a base for connecting said source through said inductor to said resistor by way of its collector-emitter path; and means for applying a bias potential to the base of said auxiliary transistor to enable it to conduct whenever the driver transistor is cut off, whereby current is enabled to at all times flow through said inductor so as to resist any changes in drive current through said inductive load when said driver transistor has its base biased by said means to enable it to be in a conductive condition.

3. A current driving circuit comprising: a load line having a varying inductive impedance; a first and second transistor driver, each having a collector, an emitter, and a base; means for connecting both said collectors to one end of said load line; a symmetrical transistor having a base and a pair of electrodes, one electrode of which is connected to the other end of said load line; a first and second auxiliary transistor, each having a collector, an emitter, and a base; a first and second resistor, each having one end thereof connected to the collector of one of said first and second auxiliary transistors; a first source of potential connected across the emitter of said first transistor and the other electrode of said symmetrical transistor, and also connected across the emitter of said first auxiliary transistor and the other end of said first resistor; a second source of potential connected across the emitter of said second transistor and said other electrode of said symmetrical transistor, and also connected across the emitter of said second auxiliary transistor and the other end of said second resistor; an inductor included in the current paths connected to said first and second source of potential; signal sources connected to the base of said auxiliary transistors for maintaining one or the other in a conductive state at all times that the respective transistor drivers are not conducting; and means for biasing the base of said first or second transistor driver to enable one or the other to conduct, thereby providing pulses in one direction or the other through said load line.

4. In a magnetic core memory system which provides for selection of drive lines which pass through rows of cores of an array by selecting a group address matrix at one end and a common line address matrix at the other end, a circuit for supplying driving current to the drive lines comprising: a first plurality of transistor drivers, each having an emitter, a collector, and a base with their bases connected to the outputs of the address matrix, each having their emitters connected to a first common junction and their collectors each connected to a group of drive lines in said array; a second plurality of transistor drivers, each having an emitter, a collector, and a base with their bases connected to the outputs of the address matrix, each having their emitters connected to a second common junction and their collectors each connected to a group of drive lines in said array; a plurality of symmetrical transistors, each having a pair of electrodes and a base with their bases connected to the outputs of the common address matrix, and their electrodes respectively connected to the common drive lines of the array and a third common junction; a first auxiliary transistor having an emitter, a collector, and a base with its collector connected by a resistance to said first common junction and its emitter connected to said third common junction; a second auxiliary transistor having an emitter, a collector, and a base with its collector connected by a resistance to said second common junction and its emitter connected to said third common junction; a first and second inductor; a first source of driving current connected by way of said first inductor across said first and third common junctions; a second source of driving current connected by way of said second inductor across said second and third common junctions; and a signal source connected to the base of said auxiliary transistors for maintaining them in a conductive state at all times that the drivers connected to the same common junction are not selected to conduct, whereby when a first transistor driver is selected to conduct, current in said first inductor is switched to flow from said first auxiliary driver in one direction through a selected drive line in said array, and when a second transistor driver is selected to conduct, current in said second inductance is switched to flow from said second auxiliary driver in the other direction through said selected drive line in said array.

5. In a magnetic core memory system which provides for selection of drive lines by selecting a group of drive lines at one end of the array with a read and write address matrix and by selection of common drive lines at the other end of the array with a common address matrix, a driving circuit comprising: a single wire passing through a line of cores for reading and writing; read drivers connected to be selected by the read address matrix, said drivers further connected between the groups of drive lines and a read common junction; an auxiliary read driver connected between the read common junction and an intermediate potential; a high potential connected to said read common junction by way of a read inductance; means to maintain said read auxiliary driver in conduction at all times except when a read driver is selected to conduct; write drivers connected to be selected by the write address matrix, said write drivers further connected between the groups of drive lines and a write common junction; an auxiliary write driver connected between the write common junction and said intermediate potential; a low potential connected to the write common junction by way of a write inductance; means to maintain said write auxiliary driver in conduction at all times except when a write driver is selected; and additional drivers connected to be selected by the common address matrix, said additional drivers further connected between the common drive lines and said intermediate potential, whereby the current from the high potential through the read inductance to the intermediate potential changes its path during reading from the auxiliary read driver to the selected read driver, and the current from the intermediate potential through the write inductance to the low potential changes its path during writing from the auxiliary write driver to the selected read driver, thus maintaining at all times a current flow through said read and write inductors, which acts during reading or writing to resist changes of current through the drive lines caused by the back electromotive force of the cores changing state and by the linear inductance in the drive lines, thereby passing half-current read and write pulses through the drive lines which have a fast rise time and a constant amplitude.

6. Apparatus in accordance with claim 5 wherein said read and write drivers are transistors having opposite operating characteristics, said read and write transistors having a base electrode, and wherein the read and write address matrices are each comprised of transistors having characteristics opposite to their associated driver transistors, said matrix transistors having a collector and base electrode, and wherein the collector electrode outputs of the transistors in the read and write address matrices are connected directly to the base electrodes of said read and write driver transistors, respectively, so as to prohibit current flow in the base electrodes of said drivers when the transistors comprising said address matrix for selecting said drivers have their base electrodes biased at cut off.

7. Apparatus in accordance with claim 5 wherein said read and write drivers are transistors having opposite operating characteristics and including a read address matrix and a write address matrix, each comprised of transistors having opposite characteristics from each other and opposite characteristics from the read and write drivers to which they are connected, said matrices each having a plurality of collector outputs and an emitter input; a high potential; a low potential; a read gating transistor connecting said high potential to the emitter end of said read address matrix; and a write gating transistor connecting said low potential to the emitter end of said write address matrix, the circuits being so connected that both address matrices can select a read and write driver at the same time but only one is effective depending on whether the read or write gating transistor is rendered conductive.

8. A magnetic core array driving circuit comprising, in combination with at least one magnetic core of such array: a drive line inductively linked to said magnetic core whereby the magnetic state of the core may be changed in response to driving current through the drive line, the drive line thereby having an impedance variable between upper and lower values; an inductor; current means to supply driving current for the drive line through the inductor; a dummy load of impedance value representative of that of said drive line; and means including switching means normally electrically connecting said dummy load to said inductor whereby the dummy load may conduct current flowing through the inductor from said current supply means, said switching means being effective when operated to concurrently disrupt flow of current through said dummy load and initiate flow of current through said drive line without substantial change in the value of current passing from said current supply means; whereby said inductor is effective to maintain substantially constant current flow through said drive line following operation of said switching means.

References Cited in the file of this patent

UNITED STATES PATENTS

| | | |
|---|---|---|
| 2,705,766 | Chen | Apr. 5, 1955 |
| 2,722,649 | Immel et al. | Nov. 1, 1955 |
| 2,802,149 | Germer et al. | Aug. 6, 1957 |
| 2,819,395 | Jones | Jan. 7, 1958 |
| 2,907,006 | Eckert | Sept. 29, 1959 |
| 2,917,727 | Reach | Dec. 15, 1959 |